US005555838A

United States Patent [19]
Bergman

[11] Patent Number: 5,555,838
[45] Date of Patent: Sep. 17, 1996

[54] OCEAN THERMAL ENERGY CONVERSION PLATFORM

[75] Inventor: Gunnar B. Bergman, Santa Barbara, Calif.

[73] Assignee: Seatek International, Inc., Santa Barbara, Calif.

[21] Appl. No.: 329,489

[22] Filed: Oct. 31, 1994

[51] Int. Cl.$^6$ ........................................ B63B 27/00
[52] U.S. Cl. ........................................ 114/265; 60/641.7
[58] Field of Search ........................ 114/125, 264, 114/265; 60/641.7

[56] References Cited

U.S. PATENT DOCUMENTS

| 4,014,279 | 3/1977 | Pearson | 114/270 |
|---|---|---|---|
| 4,112,864 | 9/1978 | Bergman . | |
| 4,829,928 | 5/1989 | Bergman . | |

OTHER PUBLICATIONS

"F & G L-1020 Trendsetter Semi-Submersible Rig", *IHI Japan*.

Philip Y. Chow and Karl L. Pan, "Commercial Otec Power Plants for Taiwan", *Oceanology International 94 Conference at Brighton, U.K.* (Mar. 1994).

Philip Y. Chow, "Ocean Thermal Energy Conversion Structures", *Structural Engineering International*, May 1994.

T. Y. Lin International and Philip Y. Chow, "A Prestudy Report for a Master OTEC Plan for the Repulic of China," *Energy Commission, Ministry of Economic Affairs*, Mar., 1993.

Robert Kowalyshyn and Roderick A. Barr, "Seakeeping Model Tests of a 400 MW Otec Spar Platform and Cold Water Pipe," *U.S. Department of Energy*, Jan. 1979.

*Primary Examiner*—Stephen Avila
*Attorney, Agent, or Firm*—Arnold, White & Durkee

[57] ABSTRACT

A method and apparatus for an OTEC platform are disclosed. The platform provides the high stability needed for OTEC applications. The platform includes a centrally located cold water pipe. The cold water pipe is suspended from a center column that is open at both the top and the bottom. The platform further includes multiple columns surrounding the cold water pipe. The columns extend from above the sea surface to deep depths below the sea surface. The OTEC platform also includes multiple power modules. The power modules are submersed below the sea surface and are utilized to provide stability to the platform. Moreover, the power modules are dispersed around the columns to provide additional stability. Various embodiments of the arrangement of the columns are also disclosed. The columns may be proximate the center column or may be placed an extended distance from the center column.

21 Claims, 7 Drawing Sheets

OCEAN THERMAL ENERGY CONVERSION PLATFORM

BACKGROUND OF THE INVENTION

The present invention relates to ocean platforms and more particularly to platforms for ocean thermal energy conversion (OTEC) applications.

OTEC systems are energy production systems that exploit the ocean temperature difference between the warm surface water and the cold water in deeper ocean strata. Typically an OTEC system includes a barge mounted plant and a large diameter cold water pipe. Cold water from the ocean depths is pumped to the surface through the cold water pipe. The cold water is then directed into an power module. The power module also receives warm water from the surface. The temperature differential between the cold water and warm water is then exploited in the generation of electric energy through well known OTEC techniques. Typically, cold water of about 4 degrees C. must be obtained. Obtaining such cold usually requires operating the OTEC system in water depths of at least 3,000 feet.

Generally, barge mounted OTEC systems are shut down when ocean wave conditions become rough. It is desirable to design an OTEC production platform that is stable enough to remain operational and permanently stationed even in rough seas (as used herein, stable generally refers to small motion response to waves, in particular small heave). However, as OTEC systems increase in size, platform stability becomes an increasing problem. OTEC systems are now being designed having a generating capability of 400 MW of energy or more. Such systems may require a cold water pipe of 100 feet in diameter that extends 3,000 feet below the ocean surface. Because of the massive size of the cold water pipe, wave induced heave, roll and pitch of the platform must be minimized since any large movement of the platform could damage the cold water pipe. Thus, it would be further desirable to design a high stability OTEC platform to accommodate large OTEC systems.

Semi-submersible platforms are often used for off-shore oil and gas drilling because of their great stability. A semi-submersible platform typically has a deck supported by columns and pontoons. The pontoons are submerged below the ocean surface and the columns extend upward from the pontoons to the deck. The pontoons and the columns provide both buoyancy and stability to the platform. Wave induced heave, roll and pitch are well known motion problems for drilling platforms. Platform stability is achieved by designing the shape and size of the columns and pontoons so that the wave forces on the platform tend to be balanced regardless of the wave direction and wave length. Generally, semi-submersible platforms are designed to balance the wave forces on the surface penetrating columns and the underwater body. Examples of semi-submersible drilling platforms that have addressed these problems are disclosed in U.S. Pat. Nos. 4,112,864 and 4,829,928 both to Bergman, and both expressly incorporated herein by reference. Typical platforms as disclosed in these patents have columns that have drafts of up to 150 feet deep.

The semi-submersible platforms designed for drilling purposes are unsatisfactory for OTEC applications for a number of reasons. First, such designs do not include a massive cold water pipe. Further, the stability of such designs is not high enough to prevent damage of the cold water pipe in extreme sea conditions. Moreover, the deep seas in which an OTEC system must operate expose the OTEC platform to higher wave forces than typically seen in oil and gas applications, thus requiring OTEC platforms to be more stable. Further, it is desirable for OTEC platforms to remain permanently stationed in all sea conditions. In addition, such oil and gas designs generally are not directed towards platforms that have structural components that extend as deep as an OTEC platform. Finally, such designs do not account for the other components of an OTEC system. For example, an OTEC platform may have fixed power cables that transmit power from the platform to shore. Additional platform stability is required to prevent undesirable movement of such power cables. Thus, it would be desirable to design a highly stable semi-submersible OTEC platform.

SUMMARY OF THE INVENTION

A variety of OTEC platforms are provided. High stability is obtained through the use of a deep centrally located column, deep outer columns and submerged power modules. In general, each OTEC platform utilizes a centrally located center column from which a cold water pipe is suspended. Preferably, the center column extends to the platform deck and has a diameter as large or larger than the cold water pipe, thus, allowing the cold water pipe to be installed from the deck. The cold water pipe extends thousands of feet deep to access cold ocean water. The center column extends from a deck to a position below the sea surface and is open on the top and bottom. By having the center column and cold water pipe open, the sea water is allowed to rise and fall freely in the pipe, thus, further improving the platform stability. The center column is a thin walled column with a wall thickness no greater than needed for structure strength. A plurality of sealed outer columns are attached to the center column. The outer columns provide buoyancy for the platform and may be placed an extended distance from the center column or placed proximate the center column.

In general, a plurality of power modules are dispersed about the outer columns. Each power module is submersed below the sea surface and is utilized to provide stability to the platform. In such a configuration, the power modules are integrated into the structure of the OTEC platform and act similar to pontoons and are essential to the stability of the platform.

In one embodiment, the present invention includes an OTEC platform which includes a plurality of buoyant columns that are attached to a deck that extend below the sea surface and at least one center column attached to the deck and also extending below the sea surface. A cold water pipe is attached to the center column. At least one OTEC power module may be connected to the platform and submerged below the sea surface. The submerged power module thus acts as a pontoon to increase the stability of the platform. The center column may have an open top and an open bottom. In a preferred embodiment, each of the at least one power modules are connected to at least one of the plurality of buoyant columns.

In a second embodiment, the platform includes a center column which has a plurality of buoyant columns attached to the center column and axisymmetrically dispersed about the center column. The center column and the buoyant columns may extend from above the sea surface to below the sea surface. A plurality of OTEC power modules are attached to the buoyant columns, each of the power modules attached to at least one of the buoyant columns. The power modules are submerged below the sea surface and have a lower end which extends below the buoyant columns. A cold water pipe is suspended from the center column. The cold water pipe, center column, and the buoyant columns provide a cold water passage which allows cold water to be transported from the deep ocean strata to the power modules.

The present invention also includes an offshore platform that may be partially submerged below the sea surface. The platform includes a deck, a center column extending from the deck to below the sea surface, and a plurality of buoyancy columns which are attached to the center column and which are placed symmetrically about the center column. The buoyancy columns extend from the deck to below the sea surface. Moreover, the platform includes a plurality of elongated members attached to the buoyancy columns. The elongated members are attached vertically and parallel to the buoyancy columns and are large enough such that a lower end of the elongated members extends below the buoyancy columns. The elongated members provide a pontoon action to stabilize the platform. The elongated members may be OTEC power modules and may be attached to each of the plurality of buoyancy columns.

The present invention further includes a method for stabilizing an OTEC platform. The method includes placing a plurality of buoyancy columns around a center structure of a platform. The center structure extends from the platform deck to the deep ocean strata. The method also includes submerging a plurality of OTEC power modules which are attached to the buoyancy columns. The submerged power modules may then be utilized to balance the wave forces acting on the platform. The methods of the present invention also include a method of operating an OTEC platform. This method of operation includes providing a platform having a deck, a center column and a plurality of buoyancy columns dispersed about the center column. To utilize this method, a plurality of OTEC power modules are attached to the plurality of buoyancy columns and submerged below the sea surface. Cold water may be pumped through a cold water pipe to the center column and then forced from the center column through the plurality of buoyancy columns to the plurality of OTEC power modules.

DETAILED DESCRIPTION

Figure 1:
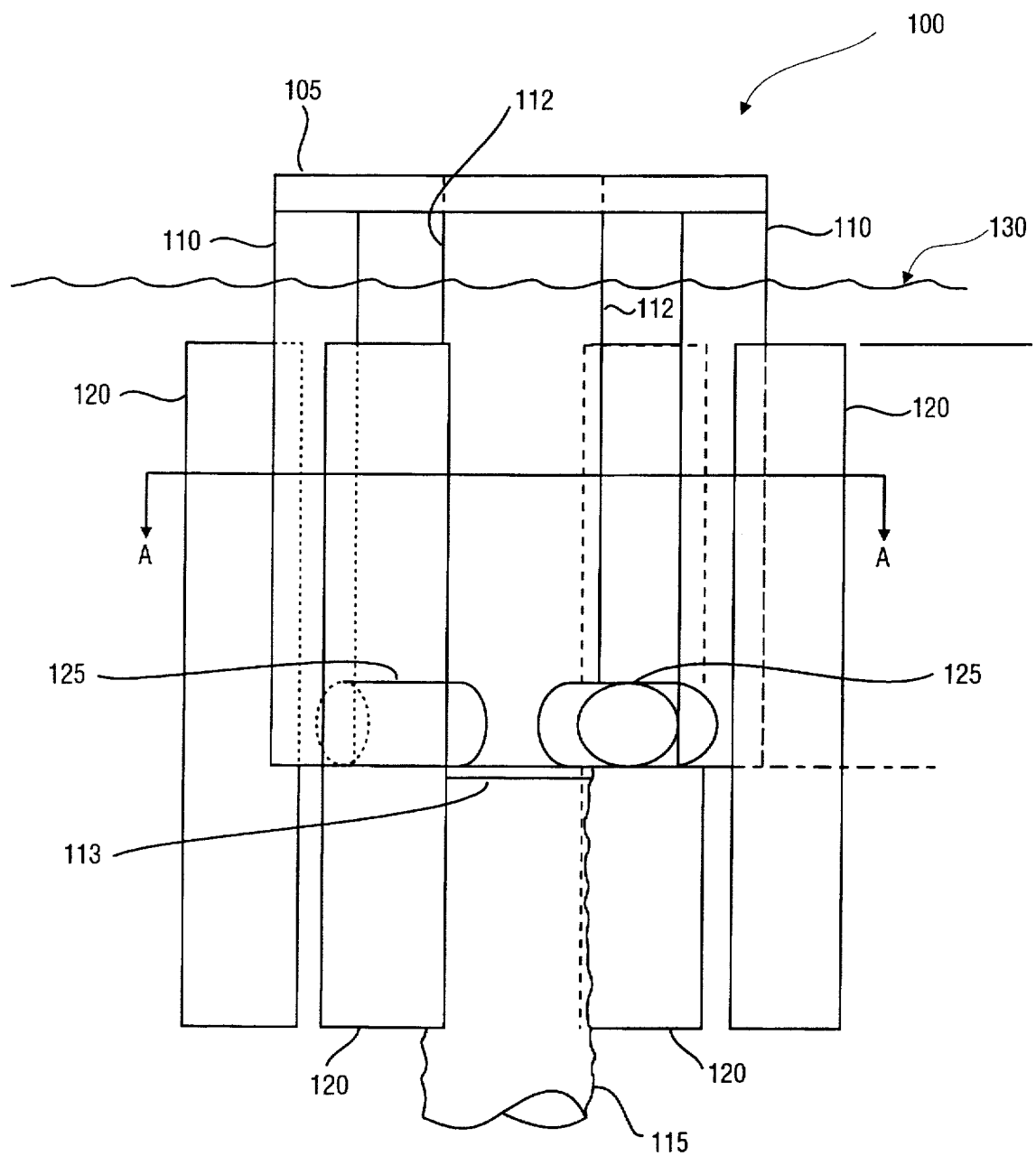
FIG. 1 is an elevation view of one embodiment of an OTEC platform according to the present invention.
Figure 2:
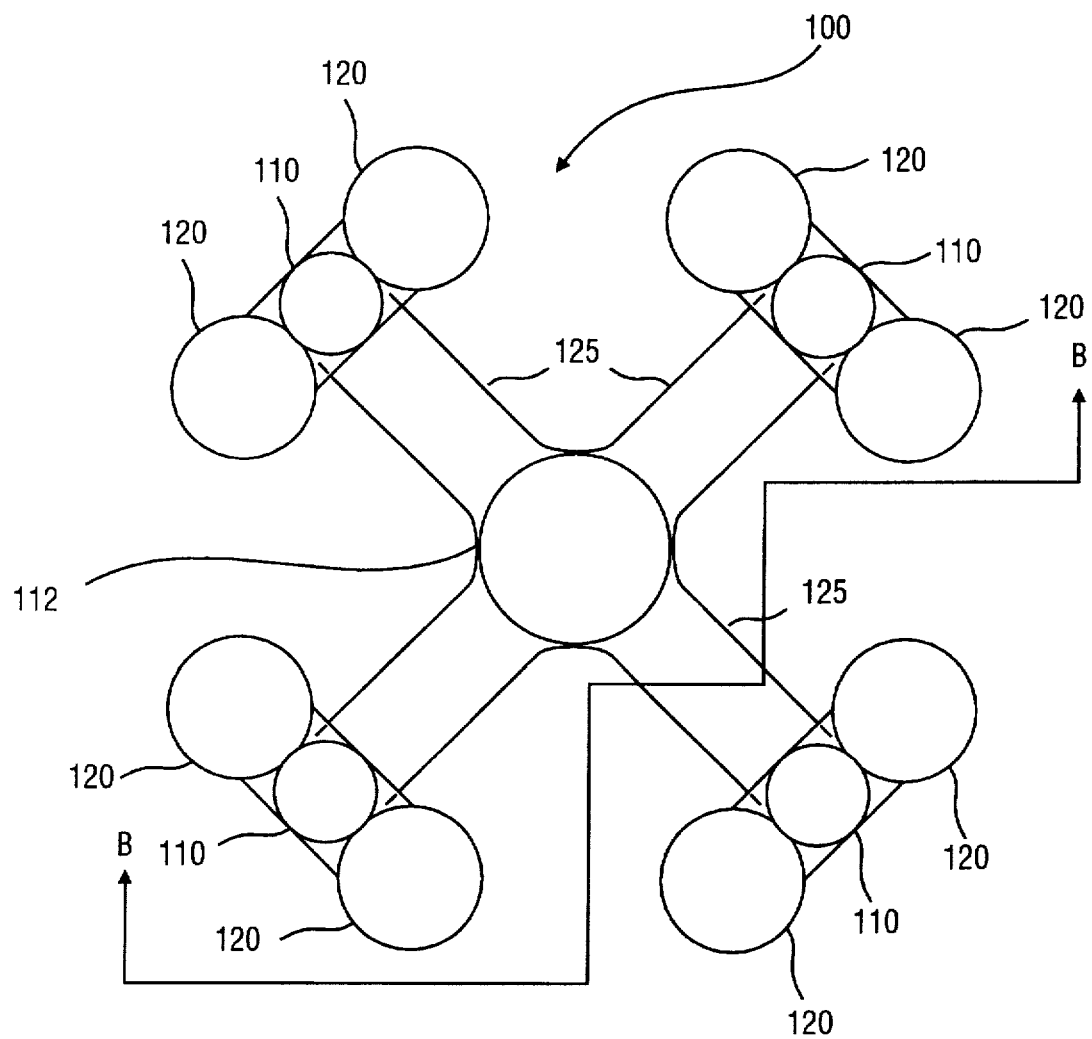
FIG. 2 is a plan view of the platform of FIG. 1.
Figure 3:
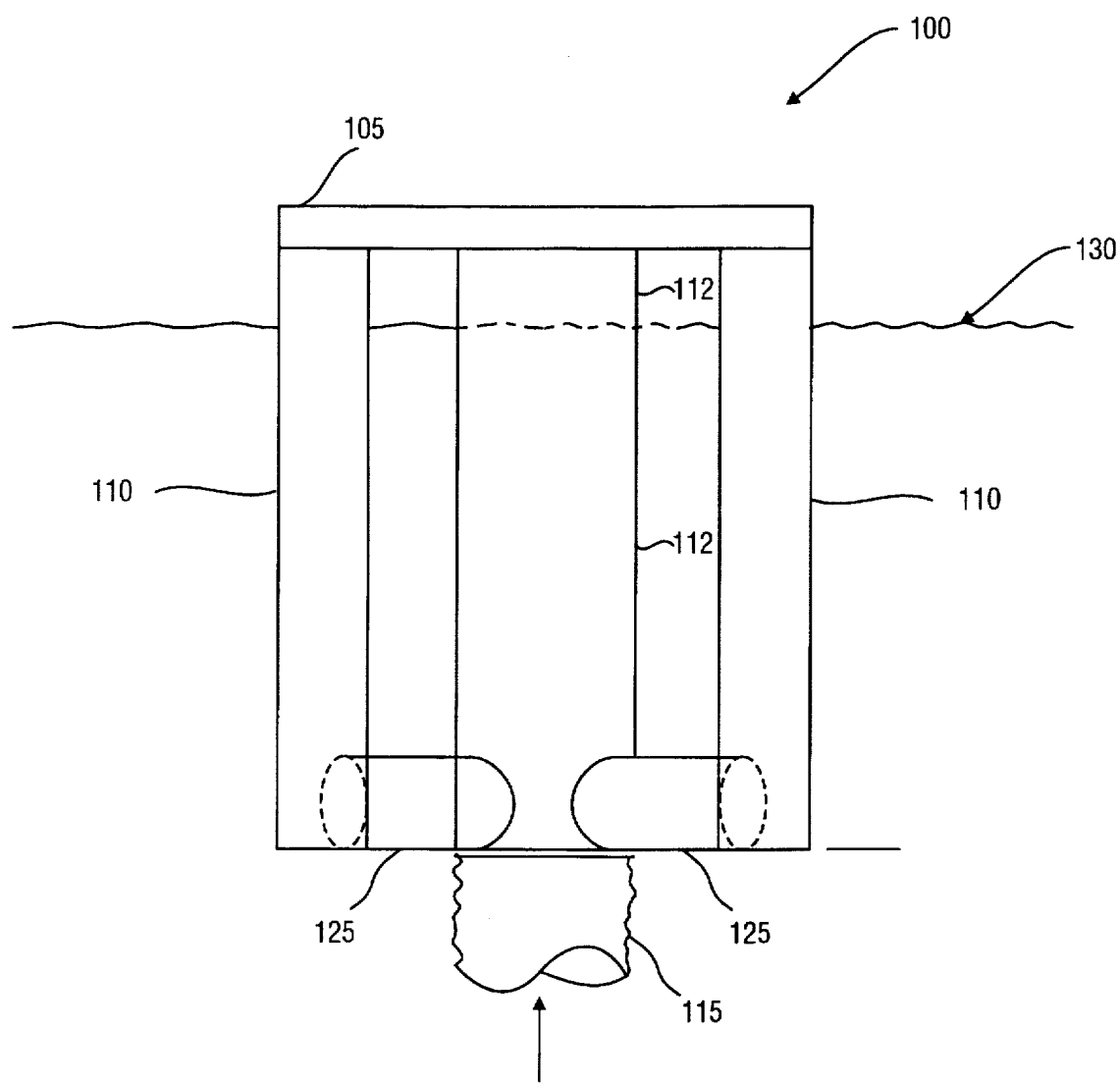
FIG. 3 is an elevation view of the platform of FIG. 1 without the power modules.

One embodiment of an OTEC platform according to the present invention is shown in FIGS. 1-3. As shown in FIG. 1, a platform 100 has a deck 105, columns 110, a cold water pipe 115, center column 112 and power modules 120. Furthermore, the platform 100 has cold water ducting 125 which connects the center column 112 to columns 110 and power modules 120.

FIG. 2 shows a plan view of platform 100 along section line A—A of the elevation view of FIG. 1. The FIG. 1 elevation view is a view along section line B—B of FIG. 2. FIG. 3 is yet another elevation view of platform 100. In FIG. 3, the power modules 120 are not shown to aid in the illustration of the various components of platform 100.

The deck 105 provides an operating surface as required for equipment, storage, personnel, etc. as is well known in the off-shore platform art. The deck 105 has an open area ("a moon pool") above the center column 112. The open moon pool allows easy access to the center column 112 and cold water pipe 115. Such access may allow the cold water pipe to be deployed or retrieved without the assistance of auxiliary vessels and also allows access to the various components within the center column 112.

Four outer columns 110 extend from the deck 105 to below the sea surface 130. It is desirable that the columns 110 extend a great depth below the sea surface, and preferably greater than 60 meters. In one embodiment, columns 110 are cylindrical with an approximate diameter of 16 meters and extend 75 meters below the sea surface 130. The columns 110 are hollow above a horizontal bulkhead within the columns (not shown) that is located just above the cold water ducting 125. The hollow portions of the columns 110 provide the necessary buoyancy of the platform 100. A center column 112 also extends from the deck 105 to below the sea surface 130. In one embodiment, center column 112 is cylindrical with an approximate diameter of 30 meters and extends 75 meters below the sea surface 130.

The center column 112 is a thin walled structure and is open at both its top end and its bottom end 113. The walls of the center column 112 may be, for example, lightweight concrete of adequate thickness for structural strength, thus providing a thin walled structure that has an inner and outer diameter that are not significantly different in size.

The center column 112 provides the structural backbone of the platform 100. The center column 112 may be connected to the outer columns 110 at the deck level and at some point below the sea surface to provide structural integrity to the platform. For example, radial piping may connect the center column 112 to the columns 110 at the deck level (not shown) and radial piping 125 may connect the bottom end of the center column 112 to the columns 110. Other methods may be used to attach the center column 112 to the columns 110, and thus, the present invention is not limited to any specific method.

The cold water pipe 115 is suspended from the bottom end 113 of the center column 112. Preferably, the center column 112 has a diameter as large or larger than the cold water pipe 115 so that the cold water pipe 115 may be installed from the deck. A variety of methods may be used to attach the cold water pipe 115 to the center column 112. For example, the cold water pipe may have an annular flared end that rests on a corresponding annular lip on the bottom end 113 of the center column 112. Alternatively, the center column 112 and the cold water pipe 115 may be connected by spherical bearings or by a universal joint. It will be recognized that numerous other attachment methods may also be utilized and the present invention is not limited to any one method of attachment.

Alternatively, the center column 112 and the cold water pipe 115 may be formed as a single center structure. In such an embodiment, the long single center structure may be comprised of a plurality of shorter segments joined together to form the single center structure or may be comprised of a single unitary piece.

The cold water pipe 115 provides the means through which deep cold ocean water is accessed. For example, the cold water pipe 115 may extend approximately 3,000 feet below the sea surface 130. The cold water pipe 115 is open on the bottom to allow access to the deep cold water. Further, the cold water pipe 115 is also open on the top. The mechanism used to bring the deep cold water up to the upper levels of the cold water pipe will be described in more detail below with reference to FIG. 4. In one embodiment, the cold water pipe 115 may be 30 meters or more in diameter.

Attached to each column 110 are power modules 120. As shown, two power modules are attached to each column; however, more or fewer modules may be attached to the columns 110. Preferably, each power module is continuously attached to the column along the entire length of the power module, however, the power modules may also be attached to the column at only selected locations along the power module. Within power modules 120 standard OTEC energy conversion equipment may be placed. For example, turbines and alternators may be driven by ammonia vapor that is condensed and heated with cold water and warm water. The power modules 120 are submerged below the sea surface 130. In one embodiment, the power modules may be approximately 22 meters in diameter and 130 meters in length. In general, the power modules are sealed except for the various water inlet, water outlet, and other access ports required for an OTEC power system. Within each power module 120, a portion of the total system power is generated. For example, as shown in the embodiment in FIGS. 1–2, eight power modules are utilized. Thus, a 400 Mw system may be created by the use of eight separate 50 Mw systems.

Figure 5:
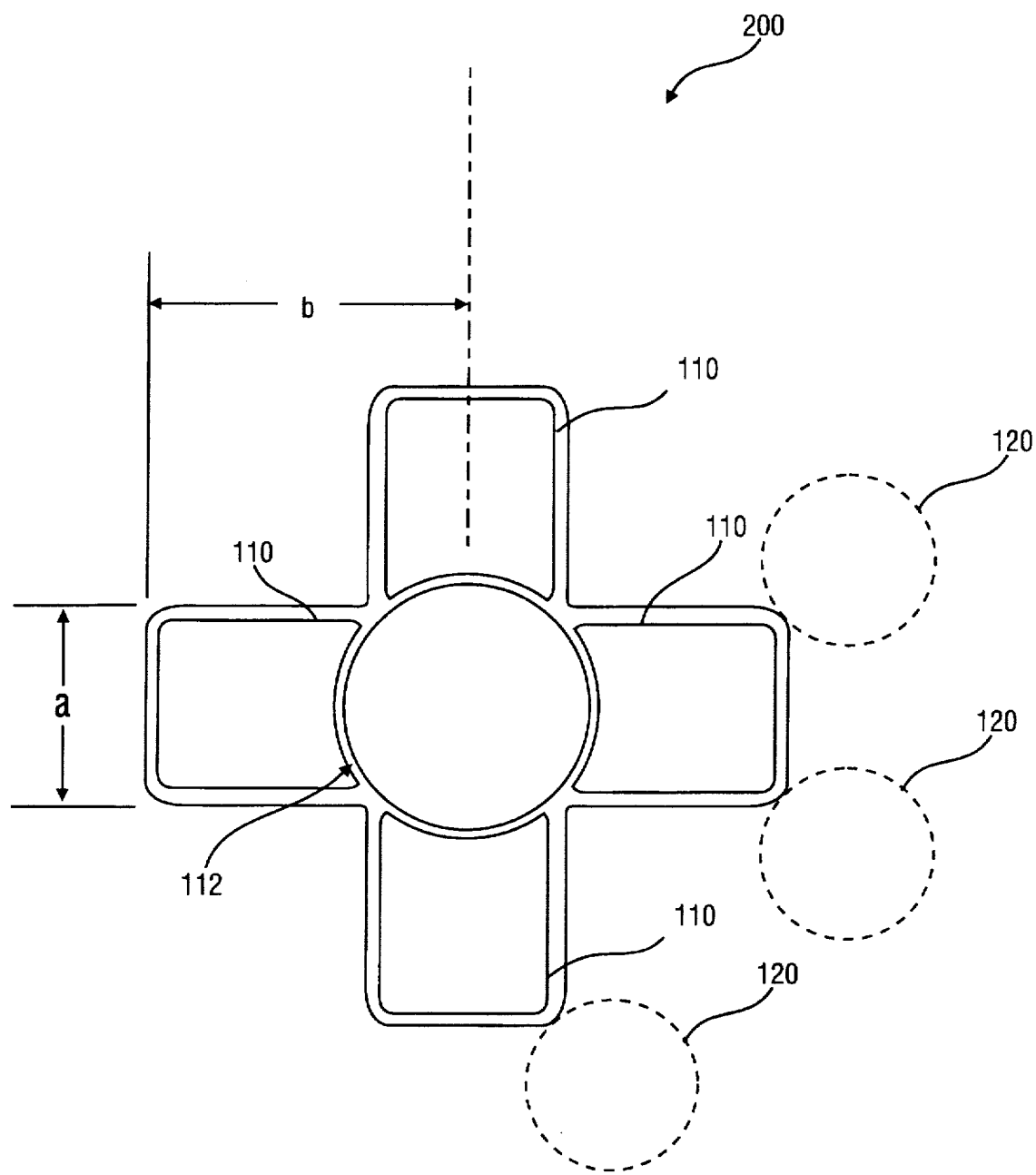
FIG. 5 is a plan view of another embodiment of an OTEC platform according to the present Invention.

The cold water ducting 125 is connected between the center column 112 and the columns 110. Alternatively, depending on the method of construction of the cold water pipe 115, the cold water ducting 125 may be connected between the cold water pipe 115 and the columns 110. Cold water ducting 125, in one embodiment, may be cylindrical and approximately 15 meters in diameter. In this embodiment, the ducting extends such that the distance from the center of the cold water pipe 115 and the center of each column 110 is approximately 54 meters. In addition to forming a transport path for cold water, the cold water ducting also serves as structural members and aids stability acting similar to the pontoons of a semi-submersible platform. As shown in an embodiment in FIG. 1, the center column 112 may be connected to the columns 110 only at the deck level and through the cold water ducting 125. However, the center column 112 may also be connected to the columns along the entire length of the columns, for example as shown in FIG. 5, thus resulting in a structurally stronger platform.

In order to provide access to warm water, the top of the power module is preferably close to the ocean surface. For example, the top of the power module may be 10 meters from the ocean surface 130. Cold water is transported up the cold water pipe 115 to the center column 112 and then through the cold water ducting 125. Cold water is then piped through the columns 110 to the power modules 120. Warm water is accessed near the top of the power modules through a warm water inlet (not shown). After having been used, the water in the power modules is returned to the ocean through water outlets (not shown). The location of the water inlets and outlets may be determined by the specific OTEC system configuration utilized within the power modules.

The columns 110, the center column 112, the cold water pipe 115, and the power modules 120 may be formed using well known semi-submersible materials. For example, the various components of platform 100 may be made from steel or lightweight concrete. Moreover, the cold water pipe may also be formed from other materials such as plastic, kevlar, carbon fiber composites, or other flexible materials.

The high stability of the platform with modules according to the present invention is achieved by the combination of several factors. The heave response is very small because the columns 110 and the modules 120 are so dimensioned that the wave forces tend to cancel each other over the entire range of wave periods of interest. This is possible because the vertical forces on the columns have a direction opposite to that of the forces acting on the modules and because the draft of the modules is large. Because the center column is thin-walled and open at the top and bottom the vertical forces acting on it are of little importance. Because the center column and cold water pipe are open at the top and bottom, the sea water may rise and fall freely within the cold water pipe. The center column functions to be the structural backbone of the platform and to be part of the duct system for the cold water to be fed to the modules. The vertical forces acting on the ducts 125, although smaller, must also be taken into account. These forces act in the same direction as those acting on the modules. The small heave response is also due to the considerable draft of the platform. The small roll (pitch) response is due mostly to the same factors, but the horizontal forces also make a contribution. However, the great draft of the platform also makes this contribution very small. The platforms disclosed herein are so massive that the cold water pipe will not significantly impact the platform stability. For example, as contemplated herein, the mass of the cold water pipe may be 30,000 tons while that of the platform is 500,000 tons.

Figure 4:
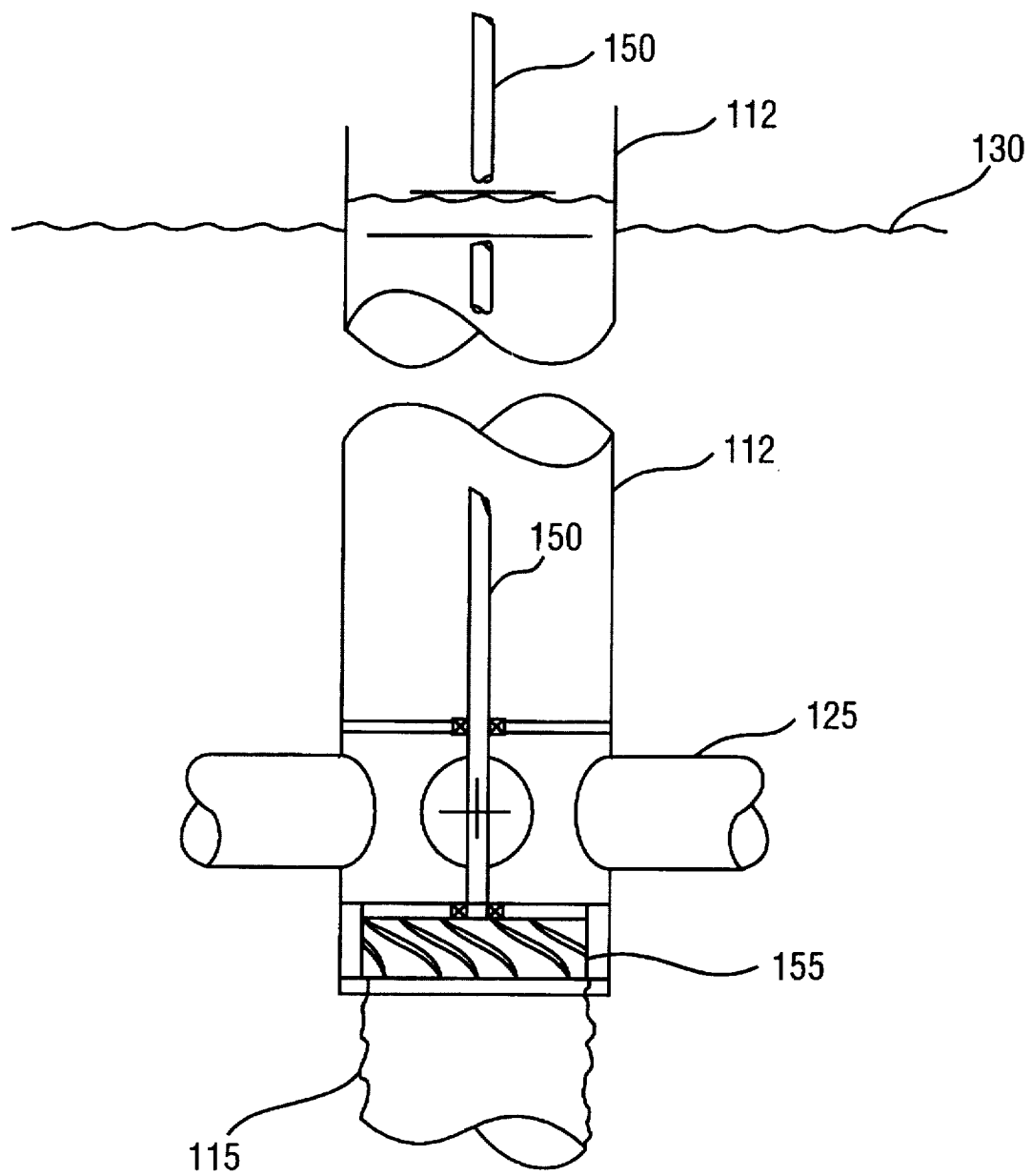
FIG. 4 is a schematic of one embodiment of the cold water pumping assembly of an OTEC platform according to the present invention.

A variety of mechanisms may be utilized to pump the cold water up from the bottom of the cold water pipe 115 to the power modules 120. The present invention it is not limited to any one specific mechanism. FIG. 4 illustrates one such pumping mechanism. A pump motor (not shown) may be located on the deck 105. Extending down through the center column 112 is a motor shaft 150. Motor shaft 150 in turn drives a cold water induction pump assembly 155, for example a large impeller. In an alternative embodiment, four smaller pump assemblies may be located in the cold water ducting tubes 125. The specific pumping mechanism utilized may be determined to a large extent by the required characteristics and criteria of the OTEC power systems contained within the power modules 120. In general, the pumping mechanism selected should have little impact on the stability of the platform 100.

Figure 6:
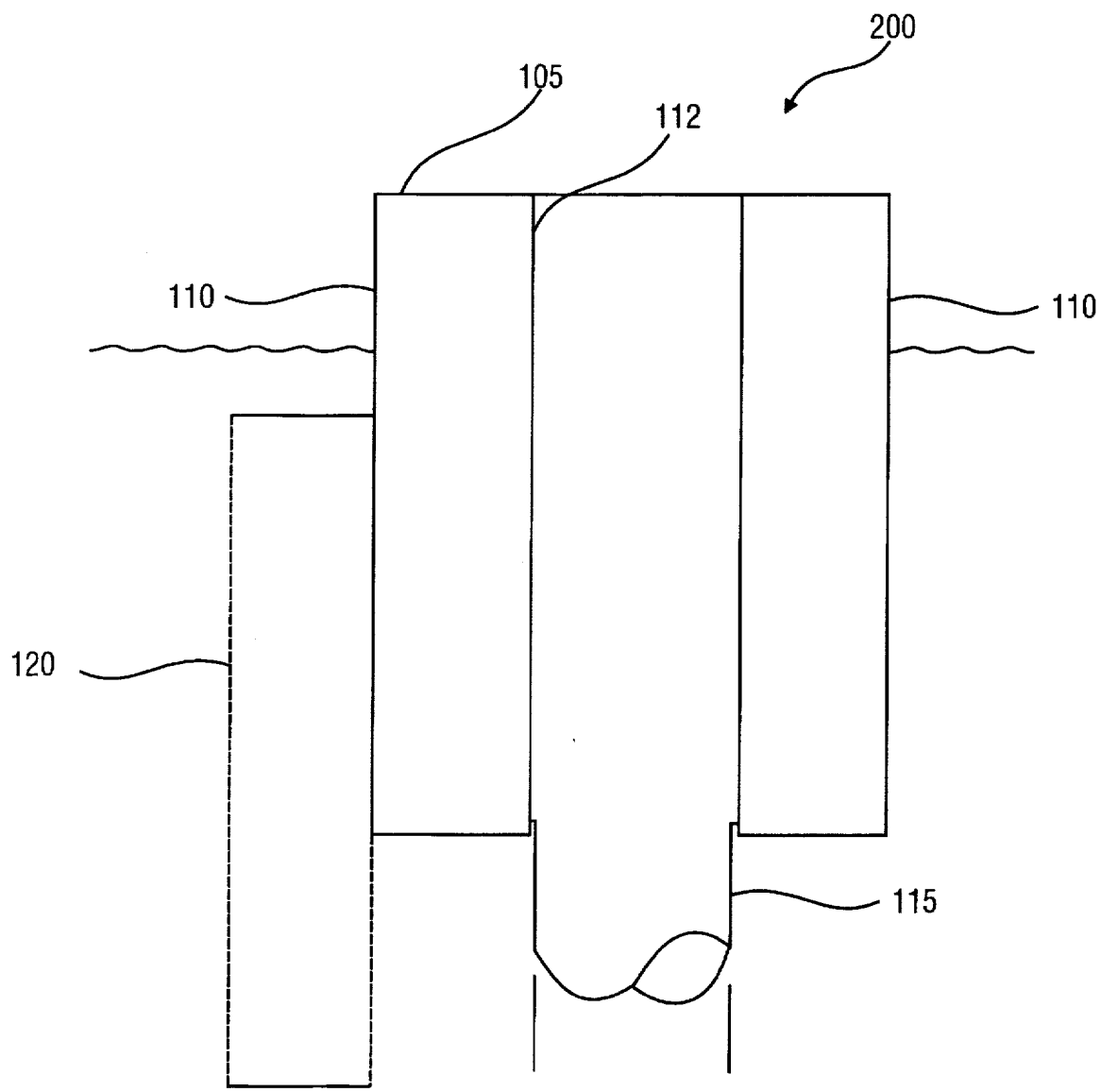
FIG. 6 is an elevation view of the platform of FIG. 5.

The high stability achieved through the use of a deep centrally mounted center column 112, deep outer columns 110, and submerged power modules 120 according to the present invention is not limited to the specific design shown in FIGS. 1–3. One such alternative embodiment may be seen in FIG. 5. FIG. 5 shows a plan view above the surface of the OTEC platform 200. In the FIG. 5 embodiment, the columns 110 are brought in closer to the centrally located center column 112 than in the embodiment shown by platform 100 of FIGS. 1–3. In such an embodiment, the center column 112 may be continuously connected to the columns 110 along the entire length of the columns 110. The cold water pipe 115 of platform 200 is suspended from the lower end of the center column 112. As may be seen from FIG. 5, the columns 110 need not be cylindrical but rather may be rectangular in shape. The power modules 120 may be attached to the corners of the columns 110 below the surface of the water as indicated by dashed lines of FIG. 5. In a preferred embodiment of the platform of FIG. 5, the dimensions of platform 200 may be such that distance a is approximately 24 meters and distance b is 40 meters. The center column 112 may be approximately 32 meters in diameter above the approximately 30 meter in diameter cold water pipe 115. An elevation cross section of platform 200 is shown in FIG. 6. In such an embodiment, it may be desirable to extend the depth of the columns 110 to approximately 100 meters below the sea surface.

Figure 7:
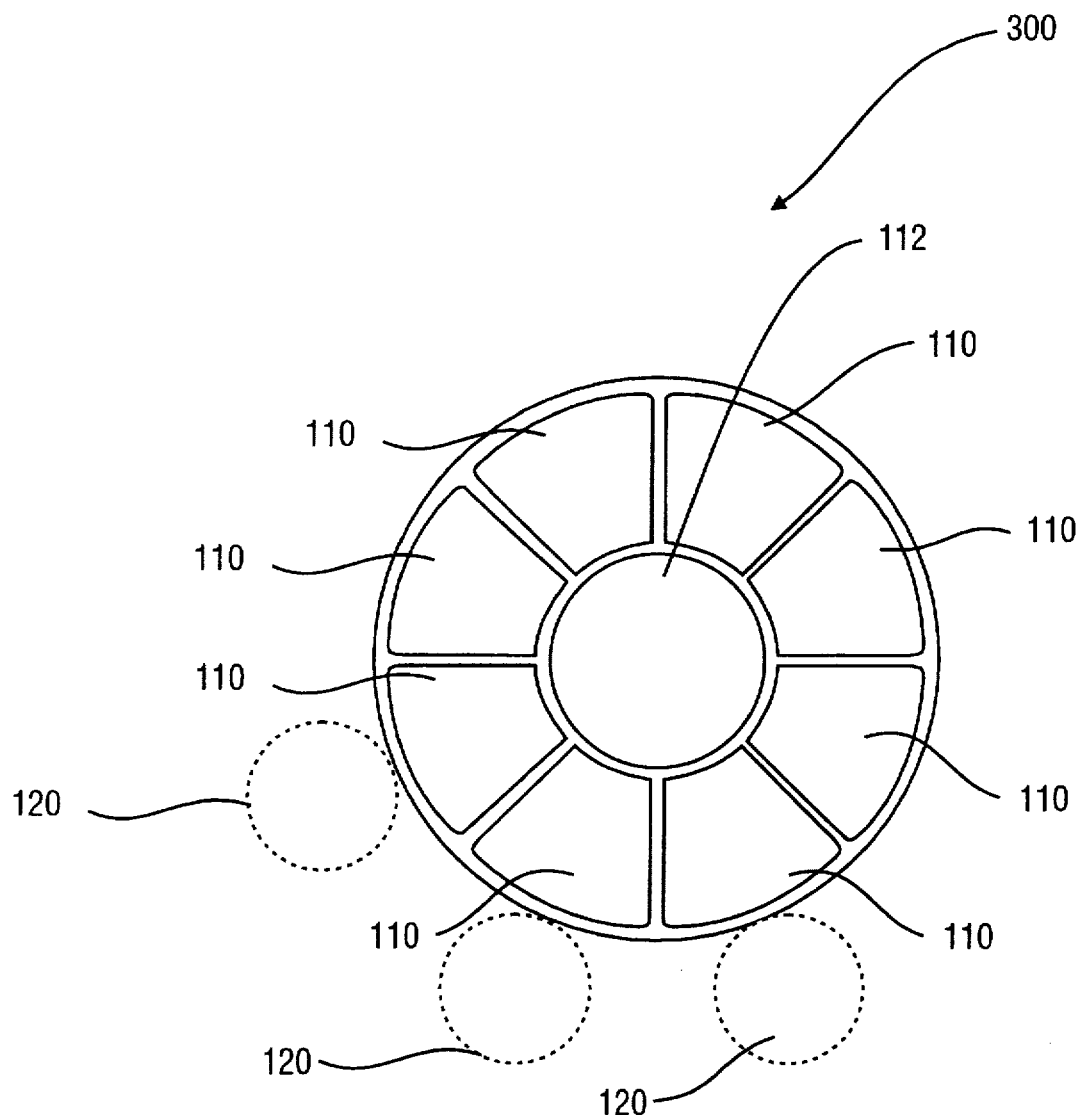
FIG. 7 is yet another embodiment of an OTEC platform according to the present invention.

Yet another embodiment of the present invention may be seen in the plan view of FIG. 7. In this embodiment, a circular platform 300 is utilized. Rather than using four columns 110 as shown in the previous embodiments, the platform 300 may utilize eight columns 110 merged into one annular column surrounding the center column 112. As shown by the dotted lines, power modules 120 may be attached to each column 110 of the platform 300 below the sea surface. In a preferred embodiment, platform 300 would have a diameter of approximately 40 meters. The cold water pipe is again suspended from the lower end of the center column 112.

Though not shown in the above embodiments, it will be recognized by those skilled in the art that power transmission cables may be utilized to transmit power from each power module to an energy load. Typically, the energy load will be located on-shore. Thus, power transmission cables will generally extend from the platform to the ocean floor and run along the ocean floor to an on-shore location. In general, the power transmission cabling will not significantly impact the stability of an OTEC platform according to the present invention. However, such power cabling more require more stringent stability criteria of the OTEC platform because it is desirable to limit the amount of movement of the cable on the ocean floor.

The various embodiments described above provide a highly stable OTEC platform. The stability of this OTEC platform is generally much greater than the stability of typical oil and gas drilling platforms. For example, the heave response amplitude operator (ROA) for a typical semisubmersible drilling platform may be as large as 0.5 for wave periods in the range 0 to 20 seconds. For the OTEC platforms described herein it would be in the range 0.05 to 0.10. Also, at periods longer than 20 seconds, the platform is superior because the resonant peak at about 27 seconds is beyond the range of wave periods of naturally occurring waves. This is not the case for a typical semisubmersible for which the natural period of heave is usually not much longer than 20 seconds. Such high stability is required to meet the demanding criteria of OTEC platforms. These criteria include an OTEC platform permanently stationed in very deep seas that may withstand conditions such as hurricanes. The features of the present invention may also be combined with features of other semi-submersible platforms. For example, even further increases in stability may be possible by utilizing the present invention in combination with suspended pontoons such as shown in U.S. Pat. No. 4,829,928.

The various OTEC platform embodiments described above may be moored for use as a permanently stationed platform. The OTEC platform may be moored to the ocean floor by utilizing standard mooring techniques known in the semi-submersible platform art.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that forms of the invention herein shown and described are to be taken as presently preferred embodiments. Various changes may be made in the shape, size, arrangement, and materials of the various components. For example, the dimensions described are described for illustrative purposes only and the present invention may be used with either larger or smaller components. Also, the various dimensions may be modified and compensating adjustments made elsewhere. Moreover, the specific arrangements and numbers of the columns may be changed while still utilizing the various aspects of the present invention including a centrally located center column, a cold water pipe suspended from the center column and submerged power modules. Thus, equivalent elements or materials may be substituted for those illustrated and described herein, and certain features of the invention may be utilized independently of the use of other features, all as would be apparent to one skilled in the art after having the benefit of this description of the invention.

What is claimed is:

1. An ocean thermal energy conversion (OTEC) platform comprising:

a deck;

at least one buoyant column attached to said deck and extending below a sea surface;

at least one center column attached to said deck and extending below the sea surface, said center column being hollow and having an open top and an open bottom, said open top and open bottom permitting sea water to rise and fall within said center column;

a cold water pipe attached to said center column; and at least one OTEC power module connected to said platform and submerged below the sea surface, said submerged power module acting as a pontoon to increase the stability of said platform.

2. The platform of claim 1 wherein said center column has a wall thickness no greater than needed for structural strength.

3. The platform of claim 1 wherein said center column and said cold water pipe are formed as a single center structure.

4. The platform of claim 1 further comprising cold water ducting attached to said center column for transporting cold water to said power modules.

5. The platform of claim 1 further comprising a plurality of buoyant columns wherein each of said at least one power module is connected to at least one of said plurality of buoyant columns.

6. The platform of claim 5 wherein one of said power modules is connected to each of said buoyant columns.

7. An ocean thermal energy conversion (OTEC) platform having a stability sufficient to be permanently stationed, comprising:

a center column, said center column extending from above a sea surface to below the sea surface, sea water allowed to rise and fall with said center column;

a plurality of buoyant columns attached to said center column and axisymmetrically dispersed about said center column, said buoyant columns extending from above the sea surface to below the sea surface;

a plurality of OTEC power modules attached to said buoyant columns, each of said power modules attached to at least one of said buoyant columns, said power modules being submerged below the sea surface and the lower ends of said power modules extending below said buoyant columns;

a cold water pipe suspended from said center column; and a cold water passage comprising said cold water pipe and said center column, said cold water passage allowing cold water to be transported from deep ocean strata to said power modules.

8. The platform of claim 7 wherein said center column and cold water pipe are formed as a single structure.

9. The platform of claim 7 wherein said buoyant columns are placed proximate the center column.

10. The platform of claim 9 wherein said buoyant columns are an extended distance from said center column.

11. The platform of claim 10, said cold water passage further comprising cold water ducting connected between said center column and said buoyant columns.

12. The platform of claim 7 wherein said plurality of buoyant columns form an annular ring of buoyant columns about said center column.

13. The platform of claim 7 wherein said buoyant columns extend at least 60 meters or more below the sea surface.

14. The platform of claim 7 wherein said center column has an open top and an open bottom permitting sea water to rise and fall freely within said center column.

15. The platform of claim 14, further comprising a pump assembly located within said cold water passage, said pump assembly forcing cold water through said passage.

16. The platform of claim 7 wherein said power modules act as pontoons to provide stability to said platform.

17. An ocean thermal energy conversion (OTEC) platform comprising:

a deck;

a center column extending from said deck to below the sea surface, said center column being hollow and having an open top and an open bottom and permitting sea water to rise and fall within said center column;

a plurality of buoyancy columns attached to said center column and placed symmetrically about said center column, said buoyancy columns extending from said deck to below the sea surface;

a plurality of elongated members attached to said plurality of buoyancy columns, said elongated members being vertical and parallel to said buoyancy columns and fully submerged below the sea surface, a lower end of said elongated members extending below said buoyancy columns, together said elongated members providing a pontoon action to stabilize said platform.

18. The platform of claim 17 wherein said elongated members are power modules and at least two power modules are attached to each of said plurality of buoyancy columns.

19. A method of stabilizing an ocean thermal energy conversion (OTEC) platform, comprising the steps of:

providing a platform having a deck above a sea surface and a center structure;

placing a plurality of buoyancy columns around said center structure, said buoyancy columns attached to said center structure and extending from said deck to below the sea surface;

extending said center structure from said deck to deep ocean strata to access deep cold water;

permitting sea water to rise and fall freely within said center structure;

attaching a plurality of OTEC power modules to said plurality of buoyancy columns;

submerging said power modules under the sea surface such that a lower end of said modules extends to an ocean depth below said buoyancy columns; and utilizing said submerged power modules to balance the wave forces acting on said platform.

20. The method of claim 19, further comprising:

forming said center structure from a center column and a cold water pipe, said center column having an open top.

21. A method of operating an ocean thermal energy conversion (OTEC) platform, comprising the steps of:

providing a platform having a deck, a center column, and a plurality of buoyancy columns dispersed about said center column, said center column extending above a sea surface;

allowing sea water to rise and fall freely within said center column;

attaching a plurality of OTEC power modules to said plurality of buoyancy columns;

submerging said power modules below the sea surface;

pumping cold water through a cold water pipe to said center column;

forcing said cold water from said center column through said plurality of buoyancy columns to said plurality of OTEC power modules.

\* \* \* \* \*

UNITED STATES PATENT AND TRADEMARK OFFICE
CERTIFICATE OF CORRECTION

PATENT NO. : 5,555,838
DATED : September 17, 1996
INVENTOR(S) : Bergman

It is certified that error appears in the above-identified patent and that said Letters Patent is hereby corrected as shown below:

In claim 10, column 9, line 7, delete "claim 9" and insert --claim 7-- therefor.

Signed and Sealed this

Tenth Day of December, 1996

Attest:

BRUCE LEHMAN

*Attesting Officer*  *Commissioner of Patents and Trademarks*